US007603112B2

(12) United States Patent  (10) Patent No.: US 7,603,112 B2
Huomo et al.  (45) Date of Patent: Oct. 13, 2009

(54) SYSTEM, MOBILE STATION, METHOD AND COMPUTER PROGRAM PRODUCT FOR MANAGING CONTEXT-RELATED INFORMATION

(75) Inventors: Heikki Huomo, Oulu (FI); Janne Jalkanen, Helsinki (FI); Harri Lakkala, Tampere (FI); Ilkka Salminen, Tampere (FI); Riku Suomela, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/817,401

(22) Filed: Apr. 2, 2004

(65) Prior Publication Data

US 2005/0003804 A1 Jan. 6, 2005

Related U.S. Application Data

(60) Provisional application No. 60/460,316, filed on Apr. 3, 2003.

(51) Int. Cl.
*H04M 3/42* (2006.01)
(52) U.S. Cl. .............. 455/414.2; 455/414.3; 455/456.3; 455/410; 455/412.2; 455/3.06; 705/64; 709/206
(58) Field of Classification Search ... 455/414.1–414.3, 455/412.1–412.2, 410–411, 418–420, 456.3, 455/3.06; 379/88.25, 88.11–15; 709/223, 709/203–206; 725/32; 707/10; 705/1, 64
See application file for complete search history.

(56) References Cited

U.S. PATENT DOCUMENTS 5,539,395 A * 7/1996 Buss et al. ................. 340/7.43
6,047,327 A * 4/2000 Tso et al. ................... 709/232

(Continued)

FOREIGN PATENT DOCUMENTS

EP 1 217 859 A1 6/2002

(Continued)

OTHER PUBLICATIONS

David Mandato, Emo Kovacs, Fritz Hohl, Hamid Amir Alikhani; CAMP: A Context-Aware Mobile Portal; Dec. 2000; pp. 52-61; Service Portability and Virtual customer Environments; 2000 IEEE San Francisco, California; XP010551463.

(Continued)

*Primary Examiner*—Sharad Rampuria
(74) *Attorney, Agent, or Firm*—Ditthavong Mori & Steiner, P.C.

(57) ABSTRACT

A mobile station for managing context-related information includes at least one sensor capable of measuring at least a portion of at least one condition of the mobile station. The mobile station also includes a context engine capable of storing context-related information based upon the portion of the condition(s), where the context engine is also capable of managing an exchange of the context-related information with at least one context consumer. The mobile station further includes a privacy engine, a script engine and a communication manager. The privacy engine can provide security and/or privacy to the exchange of the context-related information. The script engine can execute at least one context rule relating to at least a portion of the context-related information. And the communication manager can communicate with at least one context consumer external to the mobile station for the exchange of context-related information.

62 Claims, 5 Drawing Sheets

U.S. PATENT DOCUMENTS

| | | | | |
|---|---|---|---|---|
| 6,061,570 A * | 5/2000 | Janow | ................ | 455/458 |
| 6,091,956 A * | 7/2000 | Hollenberg | ............ | 455/456.5 |
| 6,094,573 A * | 7/2000 | Heinonen et al. | ...... | 455/412.1 |
| 6,108,533 A * | 8/2000 | Brohoff | ............... | 455/414.3 |
| 6,115,611 A * | 9/2000 | Kimoto et al. | .......... | 455/456.3 |
| 6,317,718 B1 * | 11/2001 | Fano | ..................... | 705/1 |
| 6,343,317 B1 * | 1/2002 | Glorikian | ................ | 709/218 |
| 6,405,033 B1 * | 6/2002 | Kennedy et al. | ......... | 455/414.1 |
| 6,556,997 B1 * | 4/2003 | Levy | ..................... | 707/10 |
| 6,647,270 B1 * | 11/2003 | Himmelstein | ........... | 455/456.1 |
| 6,678,516 B2 * | 1/2004 | Nordman et al. | ........ | 455/414.1 |
| 6,782,253 B1 * | 8/2004 | Shteyn et al. | ........... | 455/414.1 |
| 6,785,551 B1 * | 8/2004 | Richard | ................ | 455/456.1 |
| 6,795,710 B1 * | 9/2004 | Creemer | ............... | 455/456.3 |
| 6,834,195 B2 * | 12/2004 | Brandenberg et al. | .... | 455/456.3 |
| 6,879,835 B2 * | 4/2005 | Greene et al. | ........... | 455/456.1 |
| 6,912,398 B1 * | 6/2005 | Domnitz | ................ | 455/461 |
| 6,968,181 B2 * | 11/2005 | Ishidoshiro | ............ | 455/414.2 |
| 7,209,756 B2 * | 4/2007 | Yabe et al. | ............... | 455/456.3 |
| 2001/0047125 A1 | 11/2001 | Quy | | |
| 2002/0077130 A1 * | 6/2002 | Owensby | ................ | 455/466 |
| 2002/0119788 A1 | 8/2002 | Parupudi et al. | | |
| 2002/0120370 A1 | 8/2002 | Parupudi et al. | | |
| 2002/0122055 A1 | 9/2002 | Parupudi et al. | | |
| 2002/0173295 A1 * | 11/2002 | Nykanen et al. | ............ | 455/414 |
| 2002/0174073 A1 * | 11/2002 | Nordman et al. | ............ | 705/64 |
| 2002/0183004 A1 | 12/2002 | Fulton et al. | | |
| 2005/0028194 A1 * | 2/2005 | Elenbaas et al. | ............ | 725/32 |

FOREIGN PATENT DOCUMENTS

| | | |
|---|---|---|
| EP | 1 241 830 A1 | 9/2002 |
| EP | 1 241 830 B1 | 9/2002 |
| JP | 2001 236368 | 8/2001 |
| WO | WO 02/011386 A2 | 2/2002 |
| WO | WO 02/011386 A3 | 2/2002 |
| WO | WO 02/093877 | 11/2002 |

OTHER PUBLICATIONS

*The Design of Service Synthesizer on the Net*, M. Minami et al., Technical Report of IEICE, SSE2000-236, IN2000-192, vol. 100, No. 672, Mar. 2001, pp. 11.

*Context Handling Architecture for Adaptive Networking Service Environment*, t. Nakamura et al., IPSJ Journal, vol. 43, No. 2, Feb. 2002, 15 pages.

*A Study of User Context Based Service Platform*, D. Morikawa et al., Technical Report of IEICE, NS2002-279, IN2002-252, vol. 102, No. 694, Mar. 2003, pp. 115-119.

* cited by examiner

SYSTEM, MOBILE STATION, METHOD AND COMPUTER PROGRAM PRODUCT FOR MANAGING CONTEXT-RELATED INFORMATION

CROSS-REFERENCE TO RELATED APPLICATIONS

The present application claims priority from U.S. Provisional Patent Application Ser. No. 60/460,316, entitled: SYSTEM, MOBILE STATION AND METHOD FOR MANAGING CONTEXT-RELATED INFORMATION, filed on Apr. 3, 2003, the contents of which are incorporated herein by reference in its entirety.

FIELD OF THE INVENTION

The present invention relates generally to systems and methods for operating mobile stations and, more particularly, relates to systems, mobile stations and methods for managing context-related information utilizing the mobile station.

BACKGROUND OF THE INVENTION

More and more, society is evolving into a world of information. In this regard, society has become relatively good at handling this constant flow of information, being able to separate the meaningful content from the meaningless content. For example, people glance through advertisements everyday without a second thought, all while processing items such as news headlines or traffic signs. People often readily see and react to important information such as traffic lights, warning sirens, and pedestrian crossings.

In much the same way as people operate in a world of information, computers are also living in a world were information is abundant. Conventionally, a person's attention is what determines which information is meaningful and of interest. In recent times, however, the computers have become much more autonomous in processing information. For example, firewall software makes automatic decisions on which packets of information are interesting and which should be discarded. It has obviously been instructed to do so by a user, but by and large its operation is self-contained once various initial parameters have been set.

The situation for computers is changing, though. Machine-to-machine communications are increasing rapidly, with some of this traffic being directed towards the user. For example, mobile direct advertising has been envisioned many times, but it has never been successful, simply because it would be a terrible burden to the user, and possibly an invasion of privacy as well (as people often consider their mobile telephone a very personal item).

How do people process this abundant information? It is generally accepted that people process information by attaching meaning to information through context. For example, the placement of chess pieces on a chess board has no meaning until the placement is considered in the context of a chess game, where great significance is placed on the relative positions of the chess pieces. Also, for example, in traffic, driving a car means that drivers pay attention to different traffic signs than if the same drivers were walking. In general, then, context matters to the processing of information.

Whereas people process information by attaching context to the information, computing devices such as cellular telephones do not understand the concept of context. In this regard, cellular telephones will happily bleep away whether the user is in a meeting, or in a hospital. To provide context to information for the use of computing devices, users have to explicitly instruct such devices how to behave, such as by setting user profiles. But since computing devices such as cellular telephones are always with their respective users (well, nearly always anyway), such computing devices already "know" a lot about their respective users. For example, such computing devices already know if their respective users are moving, know where their respective users are located, know whether it is day or night, etc. Also, for example, such computing devices may also know portions, or all, of their respective user's calendar, or the contents of their respective user's email and/or SMS messages. Computing devices are dumb machines, however, and as such, typically have no way of knowing what their respective users want, unless somebody or something teaches them.

Techniques have been developed to provide context awareness to computing devices. Most of these techniques have concentrated on the desktop computer world, or the office world of meetings (context-sensitive whiteboards, for example). Some of them are concentrated on the problems of a tourist, providing location-sensitive information. Most importantly, however, nearly all of these prior techniques have concentrated on singular solutions to singular problems.

SUMMARY OF THE INVENTION

In light of the foregoing background, embodiments of the present invention provide a system, mobile station, method and computer program product for managing context-related information. More particularly, the system, mobile station and method of the present invention are capable of facilitating the exchange and sharing of context-related information between contextuality engines. Embodiments of the present invention also provide application program interfaces (API's) for applications that can then use, publish, and subscribe to context-related information locally, over local area networks, as well as over operator-assisted networks.

Embodiments of the present invention provide a context exchange architecture that can be implemented by a mobile station and, as such, requires relatively little, if any, fixed infrastructure. Additionally, embodiments of the present invention are capable of managing context information that may be acquired from electronic devices external to the mobile station, with the mobile station typically playing a central role as many people are in continuous contact with a mobile station and trust their mobile station. Embodiments of the present invention also have a better deployment cycle than fixed infrastructure systems and methods, with embodiments of the present invention providing for the secure transfer of context-related information, and providing the mobile station as a proxy or representative of the mobile station user in machine-to-machine communication. In addition, embodiments of the present invention provide a clean upwards compatibility path, thereby adding to the robustness of mobile stations operating according to embodiments of the present invention.

Embodiments of the present invention are capable of receiving context-related information from a variety of different sources. For example, the context-related information can be received from sources such as the user of the mobile station himself, various sensors and processors within the mobile station, other electronic devices (e.g., MP3 player, etc.), a neighborhood of mobile stations (e.g., for peer-to-peer communication). Additionally, or alternatively, the context-related information can be received from sources such as a fixed, local infrastructure, a cellular network and/or a data network.

From the context-related information, a context of the mobile station, or more particularly the user of the mobile station, can be determined based upon the context-related information, such as by applications external to the mobile station. Embodiments of the present invention are capable of determining any of a number of different contexts relating to the mobile station, and thus, the user of the mobile station. For example, embodiments of the present invention are capable of determining a physical context ("where am I," "how warm is it," etc.), a social context ("who am I with," "who am I talking to"), and/or a subject context ("what am I doing").

From the context, then, the state of the user of the mobile station can be affected, such as by modifying the configuration or state of the mobile station and/or its applications, modifying the visibility of the terminal (and thus, the user) towards the outside world, and/or modifying the awareness of the mobile station (and thus, the user) to the outside world.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
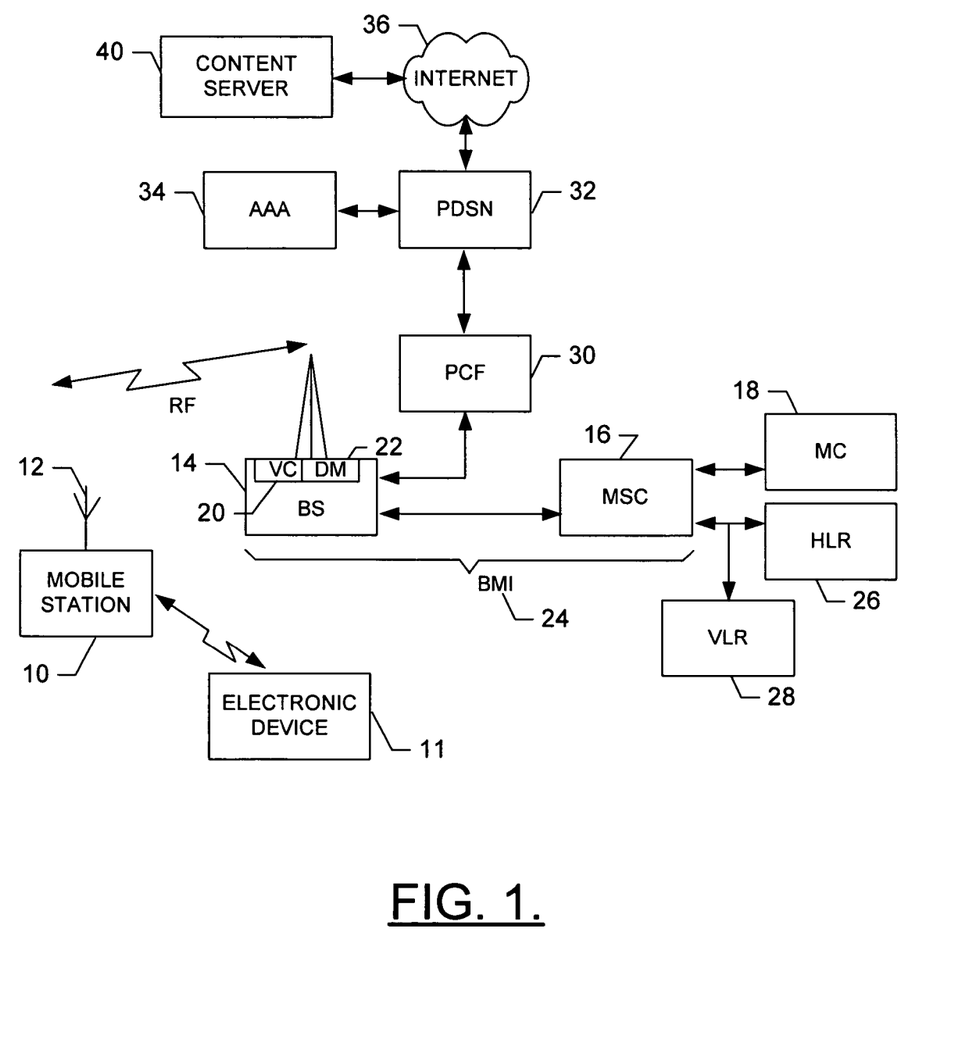
FIG. 1 is a schematic block diagram of a wireless communications system according to one embodiment of the present invention including a cellular network and a data network to which the mobile station is bi-directionally coupled through wireless RF links.
Figure 2:
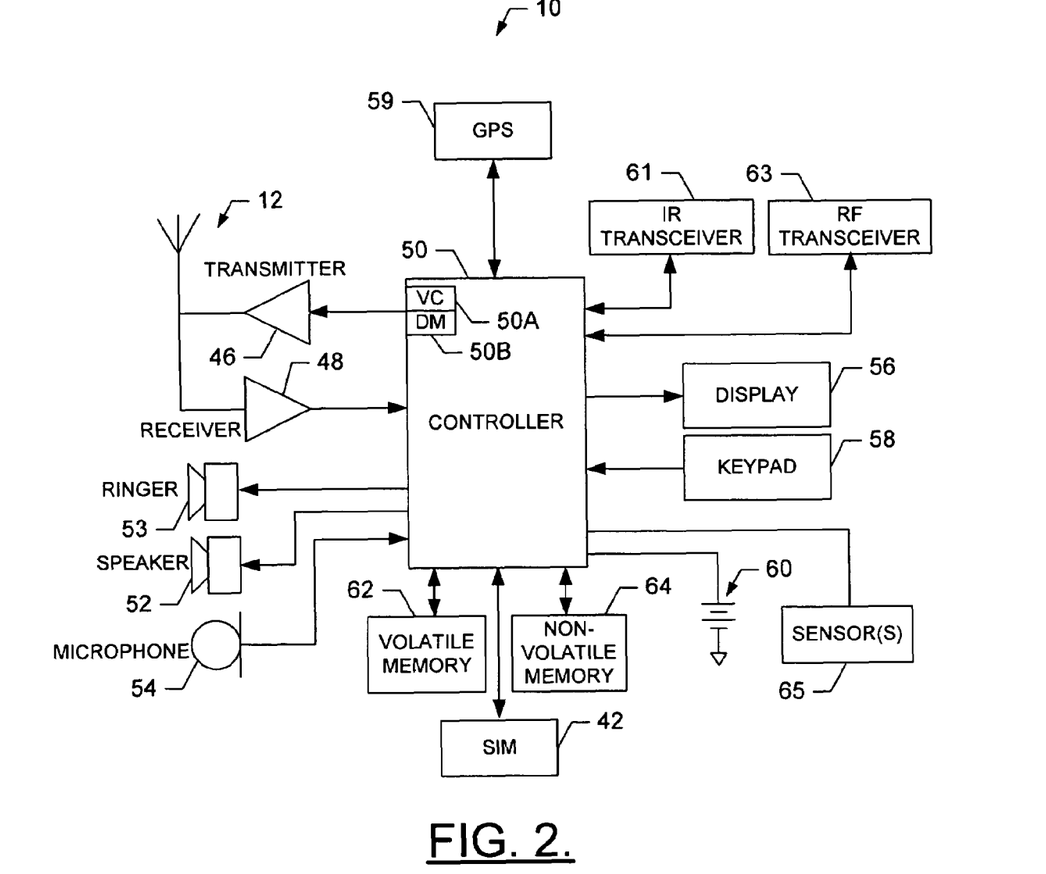
FIG. 2 is a schematic block diagram of a mobile station according to one embodiment of the present invention.

Referring to FIGS. 1 and 2, an illustration of one type of wireless communications network including a terminal, such as a mobile station, that would benefit from the present invention is provided. It should be understood, however, that the mobile telephone illustrated and hereinafter described is merely illustrative of one type of mobile station that would benefit from the present invention and, therefore, should not be taken to limit the scope of the present invention. While several embodiments of the mobile station are illustrated and will be hereinafter described for purposes of example, other types of mobile stations, such as portable digital assistants (PDAs), pagers, and other types of voice and text communications systems, can readily employ the present invention. Moreover, the system and method of the present invention will be primarily described in conjunction with mobile communications applications. But the system and method of the present invention can be utilized in conjunction with a variety of other applications, both in the mobile communications industries and outside of the mobile communications industries.

In addition, while several embodiments of the system and method of the present invention include a terminal comprising a mobile station, the terminal need not comprise a mobile station. In this regard, the terminal can comprise any of a number of other processing devices, such as a personal computer, laptop computer, server computer or the like, capable of operating according to embodiments of the present invention. Moreover, the system and method of the present invention will be primarily described in conjunction with mobile communications applications. It should be understood, however, that the system and method of the present invention can be utilized in conjunction with a variety of other applications, both in the mobile communications industries and outside of the mobile communications industries.

As shown, the mobile station 10 includes an antenna 12 for transmitting signals to and for receiving signals from a base site or base station (BS) 14. The base station is a part of a cellular network that includes a mobile switching center (MSC) 16, a message center (MC) 18, voice coder/decoders (vocoders) (VC) 20, data modems (DM) 22, and other units required to operate the network. The MSC is capable of routing calls and messages to and from the mobile station when the mobile station is making and receiving calls. As indicated above, the cellular network may also be referred to as a Base Station/MSC/Interworking function (BMI) 24. The MSC controls the forwarding of messages to and from the mobile station when the station is registered with the network, and also controls the forwarding of messages for the mobile station to and from the MC. Such messages may include, for example, voice messages received by the MSC from users of Public Switched Telephone Network (PSTN) telephones, and may also include Short Message Service (SMS) messages and voice messages received by the MSC from the mobile station or other mobile terminals serviced by the network.

Subscriber data of a mobile station 10 is stored permanently in a Home Location Register (HLR) 26 of the system and temporarily in the Visitor Location Register (VLR) 28 in the area in which the mobile station is located at a given moment. In this regard, the VLR contains selected administrative information necessary for call control and provision of the subscribed services for each mobile station currently located in the geographical area controlled by the VLR. Although each functional entity can be implemented as an independent unit, manufacturers of switching equipment generally implement the VLR together with the MSC 16 so that the geographical area controlled by the MSC corresponds to that controlled by the VLR, thus simplifying the signaling required. As such, the MSC and VLR will collectively be referred to herein as the MSC/VLR.

The mobile station 10 can also be coupled to a data network. For example, the base station BS 14 can be connected to a packet control function (PCF) 30, which is in connection with a Packet Data Serving Node (PDSN) 32. The PDSN is preferably connected to an AAA server 34, which provides Authentication, Authorization, and Accounting services. The AAA server can comprise a Remote Access Dialup User Service (RADIUS) server, as will be appreciated by those skilled in the art. The PDSN can also be connected to a wide area network, such as the Internet 36. In turn, devices such as processing elements (e.g., personal computers, server computers or the like) can be coupled to the mobile station via the PDSN. For example, the processing elements can include one or more processing elements associated with a content server 40, as illustrated in FIG. 1. By directly or indirectly connecting both the mobile station 10 and the other devices to the PDSN and the Internet, the mobile station can communicate with the other devices, such as according to the Internet Protocol (IP) specification, to thereby carry out various functions of the mobile station.

Reference is now drawn to FIG. 2, which illustrates a block diagram of a mobile station 10 that would benefit from the present invention. The mobile station includes a transmitter 46, a receiver 48, and a controller 50 that provides signals to and receives signals from the transmitter and receiver, respectively. These signals include signaling information in accordance with the air interface standard of the applicable cellular system, and also user speech and/or user generated data. In this regard, the mobile station can be capable of operating with one or more air interface standards, communication protocols, modulation types, and access types. More particularly, the mobile station can be capable of operating in accordance with any of a number of first, second and/or third-generation communication protocols or the like. For example, the mobile station may be capable of operating in accordance with second-generation (2G) wireless communication protocols such as, for example, IS-136 (TDMA), GSM and IS-95 (CDMA), and/or third-generation (3G) wireless communication protocols such as, for example, Universal Mobile Telecommunications System (UMTS), IEEE 822.11b (WLAN), General Packet Radio Service (GPRS), High-Speed Circuit-Switched Data (HSCSD) and Short Message Service (SMS).

It is understood that the controller 50 includes the circuitry required for implementing the audio and logic functions of the mobile station 10. For example, the controller may be comprised of a digital signal processor device, a microprocessor device, and various analog to digital converters, digital to analog converters, and other support circuits. The control and signal processing functions of the mobile station are allocated between these devices according to their respective capabilities. The controller thus also includes the functionality to convolutionally encode and interleave message and data prior to modulation and transmission. The controller can additionally include an internal voice coder (VC) 50A, and may include an internal data modem (DM) 50B. Further, the controller 50 may include the functionally to operate one or more software programs, which may be stored in memory (described below). For example, the controller may be capable of operating a connectivity program, such as a conventional Web browser. The connectivity program may then allow the mobile station to transmit and receive Web content, such as from origin servers 40, according to the Wireless Application Protocol (WAP), for example.

The mobile station 10 also comprises a user interface including a conventional earphone or speaker 52, a ringer 53, a microphone 54, a display 56, and a user input interface, all of which are coupled to the controller 50. The user input interface, which allows the mobile station to receive data, can comprise any of a number of devices allowing the mobile station to receive data, such as a keypad 58, a touch display (not shown) or other input device. In embodiments including a keypad, the keypad includes the conventional numeric (0-9) and related keys (#, *), and other keys used for operating the mobile station.

The mobile station further includes a battery 60 for powering the various circuits that are required to operate the mobile station. In addition, the mobile station can include a positioning sensor, such as a global positioning system (GPS) sensor 59. In this regard, the GPS sensor is capable of determining a location of the mobile station, such as longitudinal and latitudinal directions of the mobile station. The mobile station 10 can also include memory, such as a subscriber identity module (SIM) 42, a removable user identity module (R-UIM) or the like, which typically stores information elements related to a mobile subscriber. In addition to the SIM, the mobile station 10 can include other memory. In this regard, the mobile station can include volatile memory 62, such as volatile Random Access Memory (RAM) including a cache area for the temporary storage of data. The mobile station can also include other non-volatile memory 64, which can be embedded and/or may be removable. The non-volatile memory can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile station to implement the functions of the mobile station. For example, the memories can include an identifier, such as an international mobile equipment identification (IMEI) code, capable of uniquely identifying the mobile station 10, such as to the MSC 16.

The mobile station 10 can further include an infrared transceiver 61 and/or other wireline and/or wireless local data transfer devices so that data can be shared with and/or obtained from other electronic devices 11 (one of which is shown in FIG. 1) such as other mobile stations, car guidance systems, personal computers, printers, printed materials including barcodes and the like. The sharing of data, as well as the remote sharing of data, can also be provided according to a number of different techniques. Also, or alternatively, for example, the mobile station may share data using Bluetooth brand wireless technology developed by the Bluetooth Special Interest Group. Additionally, although not shown, the mobile station may share data using universal serial bus (USB) technology. Further, for example, the mobile station may include a radio frequency transceiver 63 capable of sharing data with other radio frequency transceivers, and/or with a Radio Frequency Identification (RFID) transponder tag, as such is known to those skilled in the art. For more information sharing data in accordance with one radio frequency technique, see ECMA International (European Association for Standardizing Information and Communication Systems) Standard ECMA-340 entitled: *Near Field Communication-Interface and Protocol (NFCIP*-1) (2002), the contents of which are hereby incorporated by reference in its entirety.

The mobile station 10 may also have one or more sensors 65 for sensing at least a portion of one or more ambient conditions of the mobile user and, more particularly, the mobile station operated by, or otherwise under the control of, the mobile user. In this regard, the mobile station may include sensors such as, for example, a positioning sensor, a touch sensor, an audio sensor, a compass sensor, an ambient light sensor, an ambient temperature sensor and/or a three-axis acceleration sensor. The audio sensor can comprise the microphone 54, for example, which can detect speech or environmental sounds. The positioning sensor can comprise, for example, the GPS sensor 59. Additionally, or alternatively, the positioning sensor can comprise, for example, a radio beacon triangulation sensor that determines the location of the wireless device by means of a network of radio beacons, base stations, or access points, as is described for example, in Nokia European patent EP 0 767 594 A3, entitled: Mobile Station Positioning System, published on May 12, 1999, the contents of which are hereby incorporated by reference in its entirety. As will be appreciated, the sensors can also be located in accessory-like mobile station covers and/or in a wireless accessory such as a Bluetooth-enabled device. The sensors may further be located in the environment such as in the user's rooms or vehicles. Also, information capable of being measured by the mobile station, such as the time duration of use of the mobile station, can be received as sensor data by the mobile station. For more information on such sensors, see U.S. patent application Ser. No. 09/854,628, entitled: Context Sensitive Web Services, filed May 15, 2001, which published on Nov. 21, 2002 as U.S. patent application Publication No. 2002/0173295, the contents of which is hereby incorporated by reference in its entirety.

Figure 3:
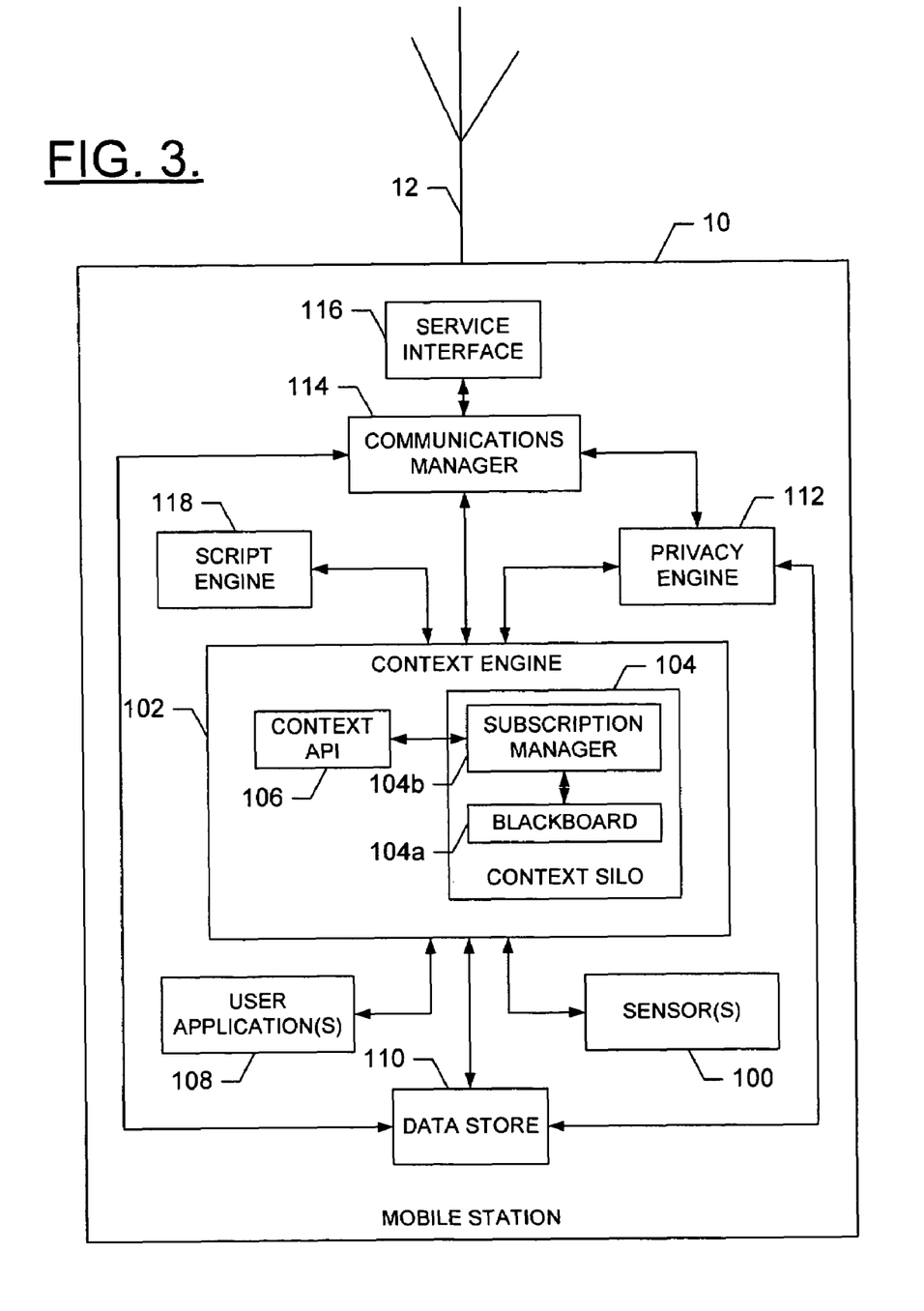
FIG. 3 is a schematic block diagram of a context exchange architecture within a mobile station, in accordance with one embodiment of the present invention.

According to embodiments of the present invention, the mobile station 10 is capable of implementing a distributed contextual architecture framework by transferring the recognition and/or use of the context data to separate, easily updateable applications or to remote servers in the system. In this regard, reference is now made to FIG. 3, which illustrates a block diagram of a context exchange architecture of the mobile station 10 in accordance with one embodiment of the present invention. As shown in FIG. 3, the context exchange architecture of the mobile station 10 according to one embodiment of the present invention includes one or more sensors 100 that are capable of providing measured and/or sensed data. The sensors are further capable of preprocessing the measured and/or sensed data into "context atoms," such as by a sensor application program interface (API), and thereafter stored. As used herein, a "context atom" generally refers to a specific piece of context-related information. A context atom can comprise an entity that typically has an associated name, value, source (i.e., originator), date and/or any of a number of other attributes. More particularly, the context atom can include other attributes including metadata information, such as the reliability of the context-related information, as well as its accuracy, source, time of creation, etc.

For example, a temperature sensor can measure the ambient temperature of the environment around the mobile station 10, and thereafter process the temperature into a context atom. Also, for example, the mobile station may store a directory that can measure, or record, the last call made from the mobile station. The last call data can then be processed into a context atom. Further, for example, a three-axis acceleration sensor can measure movement of the mobile station. Thereafter, the movement data can be processed into a context atom that may include the current absolute value of acceleration, the value integrated over several seconds, and/or a rough estimate whether the mobile station, or more particularly the mobile station user, is walking, running, standing still or perhaps sitting in a car.

The context exchange architecture of the mobile station 10 also includes a context engine 102, which is capable of receiving, and thereafter storing, the context atoms, as well as providing access to the context atoms in accordance with embodiments of the present invention. The context engine includes a context silo 104 and a context API 106. The context silo can, in turn, include a blackboard 104a and a subscription manager 104b. The blackboard is a storage unit for context-related information and, as such, typically stores the context atoms received from the sensors or other context sources (such as other electronic devices, applications, applications residing behind a network, other user terminals, etc.). Additionally, the blackboard can provide an API to query and set context atoms. The subscription manager, in turn, can provide subscriptions to various of the context atoms and/or notifications when such context atoms change. The subscription manager can therefore periodically poll the context atoms based upon such subscriptions and notifications. To provide access to the context silo, the context engine further includes the context API. In this regard, the context API allows one or more user applications 108 to access the context data from the blackboard, in accordance with embodiments of the present invention.

The blackboard 104a is capable of storing context atoms for an indefinite period of time, unless otherwise instructed. For example, one or more context atoms can include an expiration time such that after the respective context atoms expire, such context atoms can be deleted from the blackboard, with a notification transmitted to devices subscribing (described below) to the respective context atom, if so desired. As will be appreciated, however, each time a context atom is updated with different information (e.g., different values), the expiration time can be reset. Also, in such instances as when a new context atom is stored in the blackboard that has the same name and context source (indicating that it appeared from the same source) as a previous context atom already in the blackboard, the new context atom can replace the previous context atom, which can then be either discarded or moved to a history buffer, for example.

The context exchange architecture further includes a data store 110 coupled to the context engine 102. The data store is capable of storing information such as, for example, user preferences, profile information, as well as permissions for a privacy engine 112, also included within the architecture. The privacy engine is capable of providing security and privacy. More particularly, the privacy engine is capable of functioning on any of a number of different levels of security and privacy, from the lowest point of communication (e.g., a firewall) to the highest level (e.g., "who is my friend and who is not"). The user preferences and profiles in the data store, then, can control operation of the privacy engine. For example, the privacy engine can retrieve, from the data store, a list of known friends such that, when the mobile station 10 is queried for an action to be performed in accordance with embodiments of the present invention, the privacy engine can indicate whether the action is allowed by comparing the querying entity to the list of friends. In one embodiment, the privacy engine functions based on devices and/or user applications operating on context atoms in accordance with embodiments of the present invention, as well as a type of action, e.g., put, get, subscribe, notify, etc., as described below. It should be understood, however, that the privacy engine can also utilize other information, including other context atoms and data in the data store to make decisions as to permissions. In addition to the sources of context-related information within the mobile station 10 (e.g., sensors 100 and other data measuring elements), the context exchange architecture can provide for receiving context-related information from sources outside the mobile station. In this regard, the context exchange architecture includes a communications manager 114, which can identify other context sources located within a communication distance from the mobile station. In addition to identifying the other context sources, the communications manager can initiate contact with such context sources and, in general, provide housekeeping for communications with such context sources. The communications manager can also function as a firewall (along with the privacy engine 112). The communications manager can abstract different connection types to the context engine 102 such that context atoms within the context engine can be stored and/or retrieved regardless of whether the communications manager communicates with other context sources via Bluetooth, GPRS, RFID, USB, or some other link type.

To facilitate the mobile station 10 communicating with the cellular network, data network and/or other electronic devices 11, the context exchange architecture also includes a service interface 116. The service interface operates in much the same manner as the context API 106 in the context engine 102. In this regard, the service interface can comprise, for example, an over-the-air interface, as well as the underlying transport protocols (e.g., Ethernet, GPRS, TCP/IP). In accordance with various embodiments of the present invention, the context exchange architecture also provides a context exchange protocol. Generally, the context exchange protocol comprises a standardized protocol that allows different entities to exchange context atoms in a secure and reliable fashion, regardless of underlying architecture or transmission channel. In this manner, for example, at least a portion of the context atoms stored in the blackboard 104a can be stored in a separate memory device, such as a memory device coupled to a content server 40.

More particularly, the context exchange protocol defines the format in which messages relating to context atoms can be transmitted and received external to the mobile station 10, in accordance with embodiments of the present invention. In this regard, context exchange protocol provides for transmitting requests and receiving replies, where requests and replies are transmitted inside context exchange protocol messages, and where such messages can include one or more requests and/or replies. In addition to defining the format in which messages are transmitted and received, the context exchange protocol can also support all of the functionalities of the context engine 102. For example, the context exchange protocol can handle functionalities of the context engine, such as retrieving a context atom, setting and/or modifying a context atom, adding and/or removing a subscriber, and/or sending a notification to a subscriber when a context atom changes. The context exchange protocol also provides for both querying and setting context atoms, as well as setting subscribers for monitoring changes in context atoms.

The context exchange protocol can additionally support a number of different protocol functionalities. For example, messages transmitted and received in accordance with the context exchange protocol can have a set priority. In this regard, messages with higher priorities can be transmitted and received before messages with lower priorities. Messages with lower priorities can then be queued and aggregated with other messages having lower priorities and/or other messages having higher priorities, and subsequently transmitted in larger aggregate messages after a timeout period, or as other communications are occurring. For example, when initiating a call from the mobile station 10, a context exchange protocol message can be embedded into a session initiation protocol (SIP) message. As a consequence, lower priority messages can be transmitted with higher priority messages.

The context exchange protocol can further support sending error messages. Also, the context exchange protocol can be operated independent of the transportation protocol of the messages, with the messages being capable of being transmitted in accordance with any number of different protocols, such as Hypertext Transfer Protocol (HTTP), Simple Object Access Protocol (SOAP), Extensible Markup Language (XML), Simple Mail Transfer Protocol (SMTP), Short Messaging Service (SMS) and Session Initiation Protocol (SIP). Additionally, context exchange protocol messages can be compressed, encrypted and/or digitally signed in accordance with any of a number of known techniques, such as ZIP compression, XML encryption and XML signatures. Further, the context exchange protocol is expandable such that new operations can be added to the protocol without any changes to message encapsulation.

The context exchange architecture can additionally provide for creating new context atoms, as well as deleting and/or modifying existing context atoms. In this regard, the context exchange architecture can include a script engine 118, which can store rules and conditions. In one embodiment, the script engine is capable of receiving external rules according to the context exchange protocol, and thereafter storing the rules. The script engine can then examine the rules, subscribe to the relevant context atoms (described below), and then execute the rules according to conditions defined in the rules. The script engine allows complex rules to be executed for different events. As such, the script engine can reduce the need for application code, as well as reduce bandwidth requirements. Further, whereas the subscription manager typically only transmits notifications when a context atom changes, the script engine can further specify requirements of the conditions to transmit a notification. For example, the script engine can specify conditions such as "transmit a notification only when the value changes by more than 20%." In one embodiment, for example, the rules can comprise one or more Java™ classes that include executable code defining the conditions of the rules, and/or extensible markup language (XML) scripts that include Boolean logic defining the conditions of the rules.

The script engine 118 is capable of simplifying the process of operating on the context atoms, while decreasing bandwidth required to do so. For example, if an external application or electronic device desires to subscribe to a rapidly changing context atom, but does not want updates that often, the external application or electronic device can first send a context rule to the script engine that will locally subscribe to the atom, and then store a filtered version (such as a sampling at 1 hour intervals) of that atom to the blackboard 104a. The external application or electronic device can then subscribe to this filtered version, and receive updates only when this filtered version changes. Alternatively, the script engine can send the notification directly to the application or device that sent the context rule to the script engine, thereby reducing the number of context atoms in the blackboard.

Each context rule typically includes one or more conditions and one or more actions to be performed when the conditions are satisfied. In this regard, the conditions of the context rules are typically related to the context atoms, or more particularly, the values in the context atoms. The script engine 118 can execute any of a number of different context rules that include any of a number of different actions. For example, the context rules can specify the setting of a value of a context atom, the transmission of a notification, and/or the transmission of a context atom to another device and/or application. Context rules can be exchanged between the mobile station 10 and other devices, such as electronic devices 11, in a number of different manners. In one embodiment, for example, context rules can be exchanged in accordance with the context exchange protocol, such as to add a new context rule, remove a context rule and/or notify a device of an expired or otherwise disabled context rule. Alternatively, context rules can be created internally within the mobile station.

The elements of the architecture have been described independent of the mobile station block diagram of FIG. 2. It should be understood, however, that the architecture of embodiments of the present invention, such as are illustrated in FIG. 3, are capable of being performed by a mobile station that includes the elements illustrated in FIG. 2. In this regard, at least a portion of the elements of the architecture are capable of being embodied in corresponding elements illustrated in FIG. 2. For example, the blackboard 104a and/or data store 110 described below are capable of being embodied in memory such as SIM 42, volatile memory 62 and/or nonvolatile memory 64. Also, the functions of the context engine 102, script engine 118, privacy engine 112 and/or communications manager 114 are capable of being performed by controller 50. Additionally, or alternatively, one or more of the elements of the architecture of embodiments of the present invention can be performed by, and/or mirrored by, other elements of the cellular network and/or the data network of FIG. 1. For example, a copy of the contents of the blackboard in the mobile terminal can be maintained in an operator's server (e.g., content server 40).

As indicated above, context atoms typically include at least a name and a value, and may also include metadata information such as, for example, its reliability, accuracy, source, time of creation, etc. In operation, the context atoms are typically created by entities called "context producers." As used herein, a context producer typically comprises a context source, as explained above. As such, as used herein, the terms "context producer" and "context source" may be used interchangeably to refer to the same entity. A context producer can comprise any of a number of different internal or external systems, devices and/or elements capable of creating a context atom, but in one typical embodiment, a context producer can comprise an internal sensor 100 and/or user application 108, and/or an external system, device and/or element (e.g., sensor or user application) capable of pushing a context atom to the mobile station, such as in accordance with the context exchange protocol.

Figure 4:
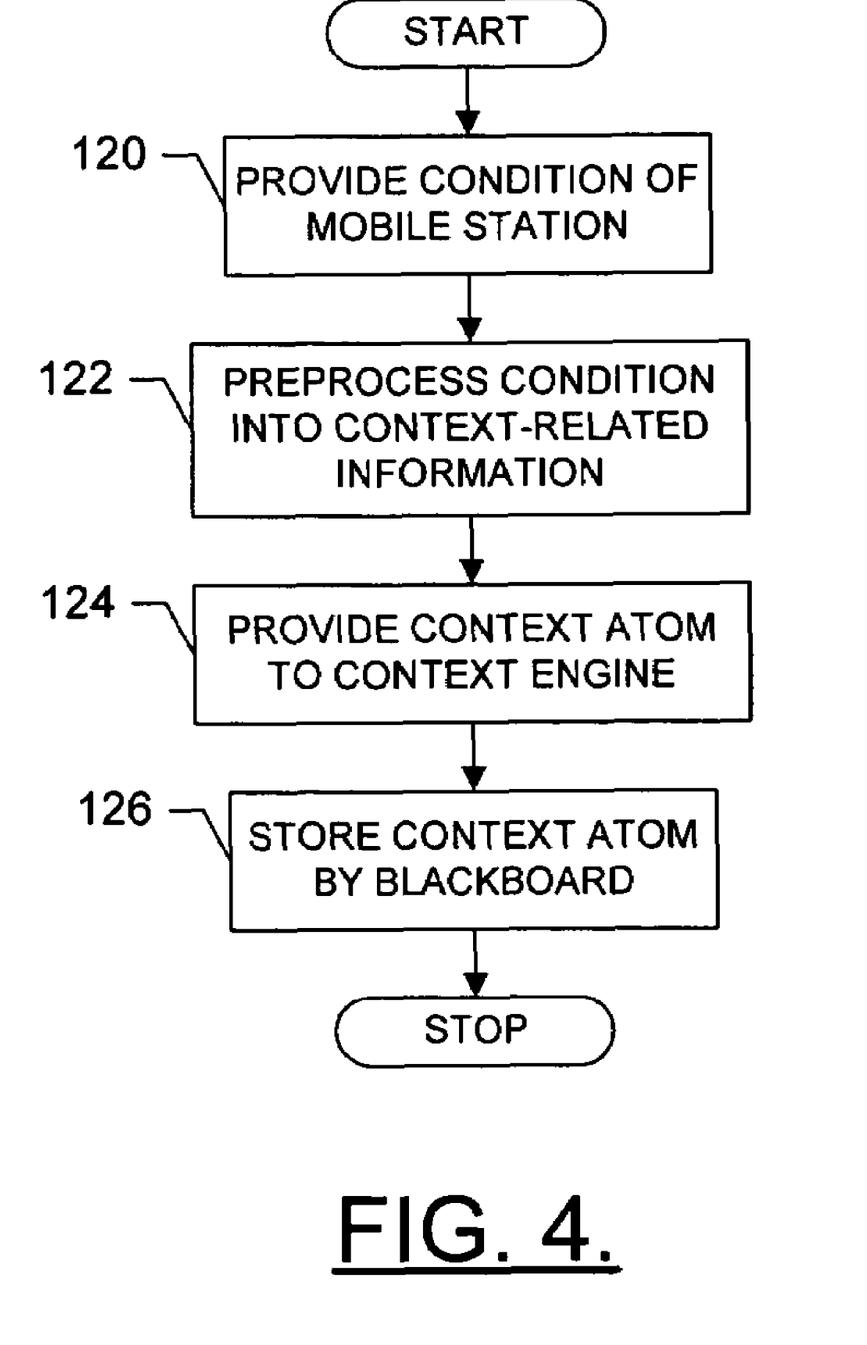
FIG. 4 is a flowchart illustrating various steps in a method of creating context-related information and thereafter making the context-related information available to context consumers.

Referring now to FIG. 4, a context atom can be created and thereafter made available by providing a condition of the mobile station, such as measured and/or sensed data, as shown in block 120. Thereafter, as shown in block 122, a context atom can be created by preprocessing the condition into context-related information. For example, a context atom can be created by preprocessing the condition into context-related information including an associated name, value, source, date and/or any of a number of other attributes, as explained above. Upon creation, the context atom can be provided to or otherwise received by the mobile station, or more particularly the context engine 102, as shown in block 124. Upon receipt by the context engine, the context atom can be stored, such as in the blackboard 104a, as shown in block 126.

For example, a thermometer can measure the ambient temperature of the environment and process the temperature measurement into the context atom "environment.temperature=95° C.," which can then be received by the context engine 102 and stored by the blackboard 104a. Additionally, or alternatively, a temperature change over a period of time can be determined, such as by a user application 108, and stored by the blackboard. As another example, a sensor (input device) can retrieve a signal from local beacons that identify the location of the mobile station and process the signal into the context atom "location.logical=sauna," which can thereafter be stored by the blackboard.

The mobile station 10 can receive measurements from any of a number of different types of local beacons capable of transmitting information such as, for example, a Bluetooth device and/or an RFID tag. In this regard, when the local beacon comprises a Bluetooth device, a Bluetooth radio within the mobile station can receive the signal from the beacon by performing a service discovery to determine the Bluetooth identifiers. The identifiers can then be stored by the blackboard as the context atoms "local Bluetooth environment." Another application, referred to as a context consumer and described below, can then subscribe to the "local Bluetooth environment," to thereby receive periodical updates of the measurements received by the Bluetooth radio. In this regard, the mobile station can monitor the area round the mobile station for electronic devices, and request location information from them, if available. The mobile station can then store any available location information back on the blackboard 104a, where other applications (context consumers) can the get the information. In the example given above, a Bluetooth beacon can announce its location to be a sauna, so that mobile station stores the context atom "location.logical=sauna" in the blackboard.

The preceding example illustrated the mobile station 10 storing a context atom identifying a logical location (i.e., sauna). It should be understood, however, context atoms can be created to identify any of a number of other types of locations, such as an exact location (e.g., GPS coordinates and/or addresses) and/or a relative location (e.g., "next to K-Mart"). The use of the GPS sensor 59 can provide location information, particularly when the mobile station is located outdoors. Even the absence of GPS location information can be useful, however, such as indicating a probability that the mobile station is located indoors, where the GPS sensor may not be able to detect location information.

Once stored within the blackboard 104a, context atoms are typically retrieved by entities referred to as "context consumers." Like the context producer, a context consumer can comprise any of a number of different internal or external systems, devices and/or elements capable of retrieving a context atom. In this regard, reference is now made to FIG. 5, which illustrates various steps in retrieving context-related information, in accordance with an embodiment of the present invention. As shown in block 128, when a context consumer desires to retrieve a context atom, the context consumer connects to the mobile station 10, or more particularly the context engine 102, such as according to the context exchange protocol when the context consumer is external to the mobile station or according to the context API 106 when the context consumer is internal to the mobile station. As shown in block 130, the context consumer can thereafter transmit, and the context engine can receive, a request identifying the context atom, such as by name. For example, a request may read "Please give me a context atom called environment.temperature," where the phrase "environment.temperature" represents the ambient temperature of the environment around the mobile station. Additionally, or alternatively, a context consumer can transmit, and the context engine can receive, a request identifying a context atom by the source of the respective context-related information, and/or a combination of the source and the context atom name, thereby permitting a context consumer to limit its queries to a specific context source. For example, a context consumer can transmit the request "Please give me all the context atoms provided by the temperature sensor in the mobile station." In one typical instance, an application may desire to act as a preprocessor to a singular sensor such that the application does not want to receive context atoms associated with other sensors providing the same context-related information. This, of course means, that the name of a context atom may not be unique, but that a context atom may be characterized by one or more other attributes, including the source of a context atom.

Figure 5:
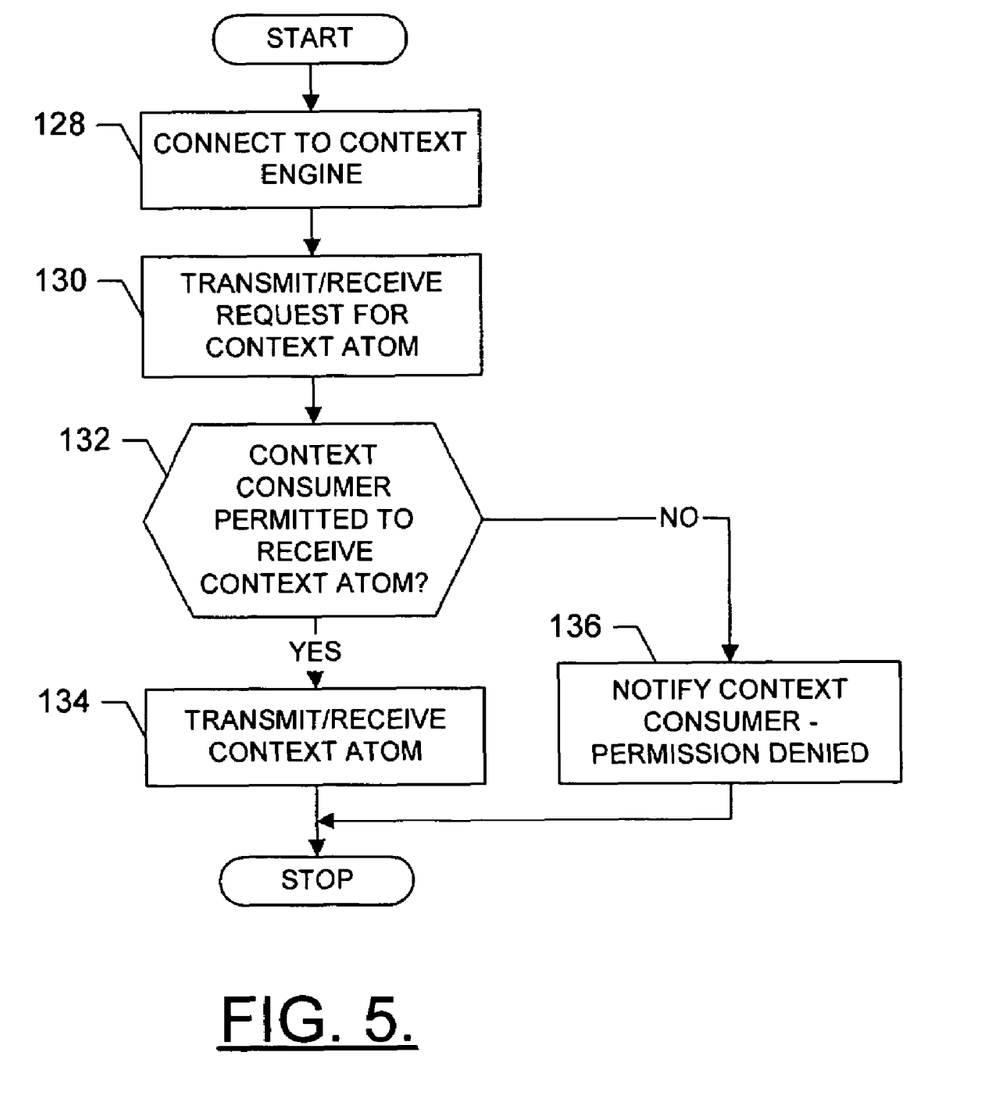
FIG. 5 is a flowchart illustrating various steps in a method of retrieving context-related information.

In response to the request, the context engine 102 can then query the privacy engine 112 as to whether the context consumer is allowed to retrieve the requested information, as shown in block 132. If the context consumer has permission to retrieve the requested context atom, the context atom is transmitted to the context consumer, as shown in block 134. In this regard, if the context atom is requested by an application internal to the mobile station (e.g., user application 108), the context atom is typically transmitted by the context engine through the context API 106. If the context atom is requested by an external application, however, the context atom is typically transmitted by the context API 106 to the communications manager 114, which will then transmit the context atom over a communications link in accordance with the context exchange protocol.

If the context consumer does not have permission to retrieve the requested context atom, however, the context atom is not transmitted to the context consumer. In such instances, as shown in block 136, the context engine 102 can transmit a message to the context consumer indicating that permission to retrieve the context atom was denied, if so desired. In case of a request received from an external application or device in accordance with the context exchange protocol, the request may be dropped silently, such as in the case of an error or a resend request. In other terms, the context engine can merely ignore the request, and therefore not transmit a response to the context consumer.

In addition to retrieving context atoms, context consumers may also be notified when particular context atoms change, such as when particular context atoms are added to the blackboard 104a, removed from the blackboard, and/or otherwise modified. In addition, the context consumers can also specify the extent of a change required before the respective context consumer is notified of the respective change. To receive notifications of changes to particular context atoms, context consumers may subscribe to particular context atoms by requesting to be placed on a notification list for one or more context atoms. As such, when the content of the respective context atom(s) contents change or expire, the context engine 102 can issue a notification to the context consumer. As will be appreciated, however, the context engine will typically check with the privacy engine 112 to determine if the consumer is allowed to receive such notifications. Thereafter, the context engine can keep the context consumer notified of any changes by transmitting a notification to the context consumer following each such change or expiration of the respective context atoms. Whereas any of a number of changes can require notification, the context engine typically transmits a notification in the event of the appearance and disappearance of an atom, change of an atom contents, and/or termination of the subscription.

Once a context consumer retrieves one or more context atoms, the context consumer can utilize the context atoms to determine a context of the mobile station 10 (or the user of the mobile station), such that the mobile station, for example, can be operated based upon the determined context. In this regard, the context consumer can determine a context of the mobile station, or more particularly the user of the mobile station, based upon requested context atoms, and thereafter transmit the context back to the mobile station such that the mobile station can perform one or more actions based upon the context. For example, the context information can be utilized to configure the mobile station based upon the determined context, such as by changing the volume of the mobile station according to ambient noise (physical context), changing menus displayed by the mobile station according to whether a user is with a digital tribe associated with the user (social context), and/or highlighting email messages that have the same context as an email displayed by the mobile station (subject context).

Additionally, or alternatively, the context information can be used to facilitate making the user of the mobile station 10 aware of the user's surroundings, such as by the mobile station receiving contextual advertisements based upon the location of the mobile station (physical context), receiving the WAP sites of businesses located in buildings nearest the mobile station (physical context), receiving a friend's shopping preferences when the user of the mobile station and the friend are shopping together (social context), receiving automatic traffic warnings when the user of the mobile station is traveling on roadways (subject context), and/or receiving price information from items the user has an interest in acquiring (subject context). Also, the context information can be used to increase the visibility of the user of the mobile station, such as by the mobile station sending a message when the mobile station, or user of the mobile station, arrives at a certain location (physical context), the mobile station displaying an indication of the mood of the user such as by changing a background color of the display 56 (social context), transmitting the user's shopping preferences when the user (with the mobile station) enters a retail store, and/or when the user is playing a game by the mobile station transmitting an indication that the user is willing to join a similar game (subject context).

As a more particular example, an application (e.g., Java™ application) can order/request information on the location of the mobile station 10 and the ambient temperature at the respective location. Continuing the sauna example above, then, after the user has entered the sauna, the application receives content atoms including the location information "sauna," as well as the temperature information 95° C. Based upon the location and temperature, the application can then determine the comfort level (i.e., context) of the user of the mobile station to be "warm." Thereafter, the application can transmit an indication of the context back to the mobile station, which stores the context in the blackboard 104a, such as another context atom "user.comfort_level=warm." If the user were not located in the sauna, but the ambient temperature remained 95° C., the application might determine the comfort level to be "hot," such that the context atom "user.comfort_level=hot," is subsequently stored by the blackboard.

In another more particular example, consider that, as known to those skilled in the art, digital tribes generally refer groups of people that users of mobile stations may communicate with electronically, such as instant messaging contacts, email contacts, etc. As the user of a mobile station may also socialize with members of the user's digital tribe, the determined context can be utilized to direct the mobile station to perform one or more actions based upon the people, or more particularly the electronic devices of the people, around the user of the mobile station. For example, if the user of a mobile station is meeting with the user's car discussion group (all of which drive '50s Chevys), the user interface of the mobile station can change to a "50s mode," with the color, displays, menus or the like changing to a '50s theme.

In yet another more particular example, consider that as a user of a mobile station 10 joins a supermarket loyalty club, the user may have an associated user application 108 installed on the mobile station. Once installed, the user application can transmit a context rule to the script engine 118 basically indicating "please trigger when location=a store in the respective supermarket chain," and thereafter subscribe to the location context atom. When the user of the mobile station arrives at a supermarket in the supermarket chain, the script engine can determine that that the condition of the context rule has been fulfilled, and initiate the user application. The user application can then download new information from a preset address, or universal resource locator (URL), and launch an advertisement on the display 56 that provides information about new offerings, new happenings around the supermarket, etc. Additionally, as the user application also subscribes to the location context, when the user leaves the supermarket, the user application can be notified, and thereafter close down. Thus, the user of the mobile station is not required to separately activate/deactivate the program.

In a further attempt to determine the context of the user of the mobile station 10, additional information can be measured, stored as context atoms, and thereafter retrieved by the context consumer in determining the context. For example, additional information such as whether or not the user is wearing clothes (which can be detected by the mobile station from tags embedded in clothes) can be taken into account when determining the comfort level. Also, for example, information determined based upon measurements, such as the change in temperature, can be utilized in determining the context. In this regard, if the temperature change is very large, for example, the context consumer may interpret the large change in temperature as the user standing too close to a stove, and/or that the mobile device is in danger to be damaged. In response to such a context determination, then, a notification can be transmitted to the user to alert the user to the perceived danger.

To also facilitate accurately determining the context of the user, a context consumer can direct certain user applications 108 (preprocessors) to change various processing parameters. In one instance, for example, when a context atom indicates a large temperature change, the context consumer can direct the user application measuring the temperature to change by reducing the sample interval such that the context consumer can more carefully track changes in the temperature.

In addition to, or in the alternative of, creating the context atom from sensors 100 on the mobile station 10, one or more context atoms can be created from sensors located on other mobile stations that are capable of communicating with the mobile station. For example, the mobile station may act as a context consumer by checking the Bluetooth neighborhood (i.e., mobile stations in the vicinity of the mobile station that are capable of communicating with the mobile station via Bluetooth technology), and requesting confirmation of the temperature from the blackboards 104a of the other mobile stations. This might be necessary, for example, if another context consumer suspects that the on-board temperature sensor is broken, or when the mobile station does not possess a temperature sensor.

As another example of a context consumer, consider a third-party user application that has been configured, such as by a doctor, to monitor the health of the user of the mobile station 10. The user application can be installed on the mobile station (i.e., user application 108), or alternatively, reside external to the mobile station (e.g., on a content server 40) with the availability of the required context items provided by the privacy engine 112. To monitor the health of the user, the user application subscribes to context atom such as "user.comfortlevel," "location.logical," and/or "user.heartbeat." The doctor can set a certain number of conditions, which can be stored in the script engine 118, related to the health of the user. For example, the conditions can monitor for instances in which the user comfort level is hot, and continues for over 30 minutes. In such instances in which the condition is met, then, the mobile station can be triggered to issue an alert to the user. If the user does not acknowledge the alert, such as by moving away from the heat source, the mobile station can be triggered to transmit a notification to alert the doctor. In addition, the user application can be configured to maintain a log file of the monitored context atoms, which can be subsequently transmitted to the doctor over the air, or at the user's next doctor appointment.

As another example of conditions related to the health of the user of the mobile station 10, consider the user has a schedule that specifies one or more times the user's blood pressure should be checked by a blood pressure monitoring device (i.e., context source). In such instances, the user can operate the blood pressure monitoring device to measure the user's blood pressure, where the measured blood pressure can thereafter be stored as a context atom (e.g., "user.blood-pressure"). Also in such instances, the schedule can be kept, for example, by the script engine 118 or, alternatively, by a calendar application operating local to or remote from the mobile station. In operation, then, the conditions can monitor for instances in which the user fails to check the user's blood pressure in accordance by a respective scheduled time, as such may be determined by comparing the timestamp of the latest respective context atom with the scheduled time. Then, when the condition is met, the mobile station can be triggered to issue an alert to the user. As before, if the user does not acknowledge the alert, such as by operating the blood pressure device to measure the user's blood pressure, the mobile station can be triggered to transmit a notification to alert the doctor.

As described above, the script engine 118 can store a number of conditions that result in an alert being issued, such as to the user of the mobile station 10. As will be appreciated, however, in various instances it may be desirable to delay or even prevent an alert being issued. Thus, the script engine can further store one or more conditions specifying that any alert be delayed or prevented from occurring. For example, continuing the example above of the mobile station being triggered to issue an alert when the user comfort level is hot and continues for over 30 minutes, or when the user fails to check the user's blood pressure in accordance by a respective scheduled time, the script engine can also store one or more conditions specifying that such alerts be delayed or prevented from occurring. For example, the conditions can monitor when the user is located within the doctor's office, and when the condition is met, delay issuing an alert until the user leaves the doctor's office, and if so desired, preventing the issuance of the alert if the condition is no longer met when the user leaves the doctor's office. In this regard, when the condition is met, the conditions can, in lieu of delaying issuance of an alert, prevent the mobile station from issuing an alert altogether.

According to one aspect of the present invention, all or a portion of the system of the present invention, such all or portions of the mobile station 10, electronic devices 11 and/or content server 40, generally operates under control of a computer program product (e.g., context engine 102, script engine 118, privacy engine 112 and/or communications manager 114, etc.). The computer program product for performing the methods of embodiments of the present invention includes a computer-readable storage medium, such as the non-volatile storage medium, and computer-readable program code portions, such as a series of computer instructions, embodied in the computer-readable storage medium.

In this regard, FIGS. 4 and 5 are flowcharts of methods, systems and program products according to the invention. It will be understood that each block or step of the flowcharts, and combinations of blocks in the flowcharts, can be implemented by computer program instructions. These computer program instructions may be loaded onto a computer or other programmable apparatus to produce a machine, such that the instructions which execute on the computer or other programmable apparatus create means for implementing the functions specified in the block(s) or step(s) of the flowcharts. These computer program instructions may also be stored in a computer-readable memory that can direct a computer or other programmable apparatus to function in a particular manner, such that the instructions stored in the computer-readable memory produce an article of manufacture including instruction means which implement the function specified in the block(s) or step(s) of the flowcharts. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block(s) or step(s) of the flowcharts.

Accordingly, blocks or steps of the flowcharts support combinations of means for performing the specified functions, combinations of steps for performing the specified functions and program instruction means for performing the specified functions. It will also be understood that each block or step of the flowcharts, and combinations of blocks or steps in the flowcharts, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A mobile station comprising:
   a context engine configured to store context-related information, the context-related information having been created based upon at least a portion of at least one condition measured by at least one sensor, wherein the context engine is also configured to manage an exchange of the context-related information with at least one context consumer;
   a communication manager configured to communicate with at least one context consumer to receive at least one context rule and exchange context-related information, the at least one context consumer located external to the mobile station, wherein at least one context rule includes at least one condition value relating to at least a portion of context-related information, and at least one action to be performed; and
   a script engine configured to execute at least a portion of at least one context rule, including being configured to perform at least a portion of a respective at least one action, based on a comparison of the respective at least one condition value and the at least one condition measured by the at least one sensor.

2. A mobile station according to claim 1, wherein the context engine comprises:
   a blackboard configured to store the context-related information; and
   a subscription manager configured to provide at least one subscription to at least a portion of the context-related information to at least one context consumer.

3. A mobile station according to claim 2, wherein the context-related information is retrievable from or stored by the blackboard.

4. A mobile station according to claim 1, wherein the context-related information is stored as at least one context atom that comprises at least a name and an associated value.

5. A mobile station according to claim 4, wherein the at least one context atom further comprises at least one of a timestamp, a source identifier, a reliability of the respective value, or an accuracy of the respective value.

6. A mobile station according to claim 5, wherein at least a portion of the context-related information is based upon at least one of a timestamp, a source identifier, a reliability of the respective value, or an accuracy of the respective value.

7. A mobile station according to claim 1 further comprising:
   a subscription manager configured to permit at least one context consumer to subscribe to at least one event regarding at least a portion of the context-related information.

8. A mobile station according to claim 1, wherein the context engine is configured to store context-related information from at least one context producer, and wherein the at least one context producer comprises at least one of an application internal to the mobile station, an application external to the mobile station or a user of the mobile station.

9. A mobile station according to claim 1 further comprising:
   at least one sensor configured to measure at least a portion of at least one condition of at least one of the mobile station or a user of the mobile station.

10. A mobile station according to claim 9, wherein the at least one sensor is further configured to process the portion of the at least one condition into context-related information.

11. A mobile station according to claim 1 further comprising:
    a privacy engine configured to provide at least a portion of at least one of security or privacy to the exchange of the context-related information.

12. A mobile station according to claim 11, wherein the privacy engine is configured to operate in accordance with the at least one received rule to one of grant or deny permission to exchange context-related information with at least one context consumer.

13. A mobile station according to claim 1, wherein the communication manager is configured to manage connectivity with at least one context producer for the exchange of context-related information, and wherein the communication manager is further configured to abstract at least one communication technology such that the context engine is configured to operate independent of the at least one communication technology.

14. A mobile station according to claim 1, wherein the context engine is configured to transmit at least a portion of the context-related information to at least one context consumer external to the mobile station such that the at least one context consumer is configured to determine a context of the mobile station based upon the transmitted portion of the context-related information.

15. A mobile station according to claim 1, wherein the context engine is configured to communicate with at least one external device according to a context exchange protocol that defines a format in which the context-related information is at least one of transmitted or received.

16. A mobile station according to claim 1, wherein a context consumer comprises an application configured to monitor a health of a user of the mobile station, wherein at least one context rule relates to the health of the user, and wherein the respective at least one context rule comprises at least a portion of at least one condition relating to the health of the user, and an alert to be issued when the respective portion of the at least one condition is satisfied.

17. A mobile station according to claim 1 further comprising:
- at least one application program interface configured to facilitate at least one of the transmission or reception of context-related information.

18. A system comprising:
- at least one context producer configured to create context-related information based upon at least a portion of at least one condition measured by at least one sensor;
- at least one context consumer configured to determine a context based upon the context-related information; and
- a mobile station configured to store context-related information created by the at least one context producer, wherein the mobile station is also configured to receive at least one context rule from at least one context consumer located external to the mobile station, and manage an exchange of the context-related information between the at least one context producer and the at least one context consumer, and wherein at least one context rule includes at least one condition value relating to at least a portion of context-related information, and at least one action to be performed,
- wherein the mobile station comprises a script engine configured to execute at least a portion of at least one context rule, including being configured to perform at least a portion of a respective at least one action, based on a comparison of the respective at least one condition value and the at least one condition measured by the at least one sensor.

19. A system according to claim 18, wherein the mobile station comprises a context engine configured to store the context-related information, and provide at least one subscription to at least a portion of the context-related information to the at least one context consumer.

20. A system according to claim 19, wherein the context-related information is retrievable from or stored by the context engine.

21. A system according to claim 18, wherein the mobile station is configured to store context-related information as at least one context atom that comprises at least a name and an associated value.

22. A system according to claim 21, wherein the mobile station is configured to store context-related information as at least one context atom that further comprises at least one of a timestamp, a source identifier, a reliability of the respective value, or an accuracy of the respective value.

23. A system according to claim 22, wherein at least a portion of the context-related information is based upon at least one of a timestamp, a source identifier, a reliability of the respective value, or an accuracy of the respective value.

24. A system according to claim 18, wherein the mobile station comprises a subscription manager configured to permit at least one context consumer to subscribe to at least one event regarding at least a portion of the context-related information.

25. A system according to claim 18, wherein the at least one context producer comprises at least one of an application internal to the mobile station, an application external to the mobile station or a user of the mobile station.

26. A system according to claim 18, wherein the at least one context producer comprises at least one sensor configured to measure at least a portion of at least one condition of at least one of the mobile station or a user of the mobile station.

27. A system according to claim 26, wherein the at least one sensor is further configured to process the portion of the at least one condition into context-related information.

28. A system according to claim 18, wherein the mobile station comprises a privacy engine configured to provide at least a portion of at least one of security or privacy to the exchange of the context-related information.

29. A system according to claim 28, wherein the privacy engine is configured to operate in accordance with at least one rule to one of grant or deny permission to exchange context-related information with the at least one context consumer.

30. A system according to claim 18, wherein the mobile station comprises a communication manager configured to manage connectivity with the at least one context producer for the exchange of context-related information, and wherein the communication manager is further configured to abstract at least one communication technology such that the mobile station is configured to operate independent of the at least one communication technology.

31. A system according to claim 18, wherein the mobile station is configured to transmit at least a portion of the context-related information to the at least one context consumer external to the mobile station such that the at least one context consumer is configured to determine a context of the mobile station based upon the transmitted portion of the context-related information.

32. A system according to claim 18, wherein the mobile station is configured to communicate with at least one external device according to a context exchange protocol that defines a format in which the context-related information is at least one of transmitted or received.

33. A system according to claim 18, wherein a context consumer comprises an application for monitoring a health of a user of the mobile station, wherein at least one context rule relates to the health of the user, and wherein the respective at least one context rule comprises at least a portion of at least one condition relating to the health of the user, and an alert to be issued when the respective portion of the at least one condition is satisfied.

34. A system according to claim 18, wherein the mobile station comprises at least one application program interface configured to facilitate at least one of the transmission or reception of context-related information.

35. A system according to claim 18 further comprising:
- at least one electronic device configured to communicate with the mobile station, wherein the at least one electronic device comprises a context engine configured to store at least a portion of the context-related information stored by the mobile station.

36. A method for operating a mobile station, comprising:
- storing context-related information, the context-related information having been created based upon the portion of the at least one condition measured by at least one sensor;
- receiving at the mobile station at least one context rule from at least one context consumer located external to the mobile station, the at least one context rule including at least one condition value relating to at least a portion of context-related information, and at least one action to be performed; and
- managing at the mobile station an exchange of the context-related information with at least one context consumer, wherein managing the exchange comprises:
  - receiving a request for at least a portion of the context-related information from a context consumer;
  - transmitting the requested portion of the context-related information to the respective context consumer in response to the request; and
  - executing at least one context rule, including performing at least a portion of a respective at least one action, based on a comparison of the respective at least one condition value and the at least one condition measured by the at least one sensor.

37. A method according to claim 36, wherein managing an exchange of the context-related information further comprises:
providing at least one subscription to at least a portion of the context-related information to the at least one context consumer.

38. A method according to claim 36, wherein storing context-related information comprises storing context-related information as at least one context atom that comprises at least a name and an associated value.

39. A method according to claim 38, wherein storing context-related information comprises storing context-related information as at least one context atom that further comprises at least one of a timestamp, a source identifier, a reliability of the respective value, or an accuracy of the respective value.

40. A method according to claim 39, wherein at least a portion of the context-related information is based upon at least one of a timestamp, a source identifier, a reliability of the respective value, or an accuracy of the respective value.

41. A method according to claim 36 further comprising measuring at least a portion of at least one condition, wherein measuring at least a portion of at least one condition comprises measuring at least a portion of at least one condition by at least one context producer comprising at least one of an application internal to the mobile station, an application external to the mobile station or a user of the mobile station.

42. A method according to claim 36 further comprising measuring at least a portion of at least one condition, wherein measuring at least a portion of at least one condition further comprises processing the portion of the at least one condition into context-related information.

43. A method according to claim 36, wherein managing an exchange of the context-related includes determining whether to grant permission to exchange context-related information in accordance with at least one rule.

44. A method according to claim 36, wherein transmitting the requested portion of the context-related information comprises transmitting the requested portion of the context-related information to at least one context consumer external to the mobile station such that the at least one context consumer is configured to determine a context of the mobile station based upon the transmitted portion of the context-related information.

45. A method according to claim 36, wherein a context consumer comprises an application for monitoring a health of a user of the mobile station, wherein at least one context rule relates to the health of the user, and wherein the respective at least one context rule comprises at least a portion of at least one condition relating to the health of the user, and an alert to be issued when the respective portion of the at least one condition is satisfied.

46. A computer-readable storage medium having computer-readable program code portions stored therein, the computer-readable program code portions comprising:
a first executable portion configured to store context-related information a mobile station, the context-related information having been created based upon the portion of the at least one condition measured by at least one sensor;
a second executable portion configured to receive at the mobile station at least one context rule from at least one context consumer located external to the mobile station, the at least one context rule including at least one condition value relating to at least a portion of context-related information, and at least one action to be performed; and
a third executable portion configured to manage at the mobile station an exchange of the context-related information with at least one context consumer, wherein the third executable portion is configured to receive a request for at least a portion of the context-related information from a context consumer, and provide for transmission of the requested portion of the context-related information to the respective context consumer in response to the request,
wherein the third executable portion is further configured to execute at least one context rule, including performing at least a portion of a respective at least one action, based on a comparison of the respective at least one condition value and the at least one condition measured by the at least one sensor.

47. A computer-readable storage medium according to claim 46, wherein the third executable portion is further configured to provide at least one subscription to at least a portion of the context-related information to the at least one context consumer.

48. A computer-readable storage medium according to claim 46, wherein the first executable portion is configured to store context-related information as at least one context atom that comprises at least a name and an associated value.

49. A computer-readable storage medium according to claim 48, wherein the first executable portion is configured to store context-related information as at least one context atom that further comprises at least one of a timestamp, a source identifier, a reliability of the respective value, or an accuracy of the respective value.

50. A computer-readable storage medium according to claim 49, wherein at least a portion of the context-related information is based upon at least one of a timestamp, a source identifier, a reliability of the respective value, or an accuracy of the respective value.

51. A computer-readable storage medium according to claim 46, wherein the computer-readable program code portions further comprise a third executable portion configured to measure at least a portion of at least one condition, wherein the third executable portion is further configured to process the portion of the at least one condition into context-related information.

52. A computer-readable storage medium according to claim 46, wherein the third executable portion being configured to manage an exchange further comprises being configured to determine whether to grant permission for the context consumer to receive the requested portion of the context-related information, and
wherein the third executable portion being configured to transmit the requested portion includes being configured to transmit the requested portion of the context-related information when permission is granted.

53. A computer-readable storage medium according to claim 46, wherein the third executable portion is configured to provide for transmission of the requested portion of the context-related information to at least one context consumer external to the mobile station such that the at least one context consumer is configured to determine a context of the mobile station based upon the transmitted portion of the context-related information.

54. A computer-readable storage medium according to claim 46, wherein a context consumer comprises an application for monitoring a health of a user of the mobile station, wherein at least one context rule relates to the health of the user, and wherein the respective at least one context rule comprises at least a portion of at least one condition relating to the health of the user, and an alert to be issued when the respective portion of the at least one condition is satisfied.

55. A mobile station according to claim 1, wherein the context-related information is stored as at least one context atom that comprises at least a name and an associated value, the mobile station further comprising:
a subscription manager configured to provide a context consumer with a subscription to a context atom to thereby permit the respective context consumer to receive a notification when the respective context atom changes.

56. A method according to claim 36, wherein storing context-related information comprises storing context-related information as at least one context atom that comprises at least a name and an associated value, and wherein managing an exchange of the context-related information further comprises:
providing a context consumer with a subscription to a context atom to thereby permit the respective context consumer to receive a notification when the respective context atom changes.

57. A method according to claim 36, wherein managing an exchange further comprises:
determining whether to grant permission for the context consumer to receive the requested portion of the context-related information, and
wherein transmitting the requested portion comprises transmitting the requested portion of the context-related information when permission is granted.

58. A computer-readable storage medium according to claim 46, wherein the first executable portion is configured to store context-related information as at least one context atom that comprises at least a name and an associated value, and
wherein the third executable portion is further configured to provide a context consumer with a subscription to a context atom to thereby permit the respective context consumer to receive a notification when the respective context atom changes.

59. A computer-readable storage medium according to claim 52, wherein the third executable portion is configured to determine whether to grant permission in accordance with at least one rule.

60. A mobile station comprising a processor and a memory storing executable instructions that in response to execution by the processor cause the apparatus to at least perform the following:
storing context-related information, the context-related information having been created based upon the portion of the at least one condition measured by at least one sensor;
receiving at the mobile station at least one context rule from at least one context consumer located external to the mobile station, the at least one context rule including at least one condition value relating to at least a portion of context-related information, and at least one action to be performed; and
managing at the mobile station an exchange of the context-related information with at least one context consumer, wherein managing the exchange comprises:
receiving a request for at least a portion of the context-related information from a context consumer;
transmitting the requested portion of the context-related information to the respective context consumer in response to the request; and
executing at least one context rule, including performing at least a portion of a respective at least one action, based on a comparison of the respective at least one condition value and the at least one condition measured by the at least one sensor.

61. A mobile station according to claim 60, wherein managing an exchange of the context-related information further comprises:
providing at least one subscription to at least a portion of the context-related information to the at least one context consumer.

62. A mobile station according to claim 60, wherein the memory stores executable instructions that in response to execution by the processor cause the apparatus to further perform the following:
measuring at least a portion of at least one condition, wherein measuring at least a portion of at least one condition comprises measuring at least a portion of at least one condition by at least one context producer comprising at least one of an application internal to the mobile station, an application external to the mobile station or a user of the mobile station.

* * * * *